United States Patent
Zhao et al.

(10) Patent No.: US 12,496,967 B2
(45) Date of Patent: Dec. 16, 2025

(54) VEHICLE SYSTEM FOR DETECTING ACOUSTIC FREQUENCIES

(71) Applicant: GM Global Technology Operations LLC, Detroit, MI (US)

(72) Inventors: Xu Fang Zhao, LaSalle (CA); Alaa M. Khamis, Courtice (CA); Gaurav Talwar, Novi, MI (US); Kenneth Ray Booker, Grosse Pointe Woods, MI (US); Scott Thomas Droste, West Bloomfield, MI (US); Russell A. Patenaude, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 96 days.

(21) Appl. No.: 18/496,834

(22) Filed: Oct. 27, 2023

(65) Prior Publication Data

US 2025/0135993 A1   May 1, 2025

(51) Int. Cl.
*G06V 20/56* (2022.01)
*B60Q 9/00* (2006.01)
*G06V 10/94* (2022.01)
*H04R 1/02* (2006.01)

(52) U.S. Cl.
CPC ............... *B60Q 9/00* (2013.01); *G06V 10/95* (2022.01); *G06V 20/56* (2022.01); *H04R 1/028* (2013.01); *H04R 2499/13* (2013.01)

(58) Field of Classification Search
CPC .......... B60Q 9/00; B60Q 9/004; B60Q 9/005; G06V 20/56; G06V 20/58; G06V 20/588; G06V 20/60; G06V 20/62; G06V 20/625; H04R 2499/13; B60R 2021/01013; B60R 21/013; B60R 2021/01302; B60W 50/14; B60W 2050/143
USPC ........................................................ 348/148
See application file for complete search history.

(56) References Cited

U.S. PATENT DOCUMENTS

| | | | |
|---|---|---|---|
| 9,600,734 B2* | 3/2017 | Prakash | G06F 18/22 |
| 2007/0139182 A1* | 6/2007 | O'Connor | H04W 4/90 |
| | | | 340/539.22 |
| 2014/0169634 A1* | 6/2014 | Prakash | G06F 18/22 |
| | | | 382/105 |
| 2019/0096215 A1* | 3/2019 | Shahid | G08G 1/09626 |
| 2020/0023797 A1* | 1/2020 | Volos | B60R 21/013 |
| 2021/0026019 A1* | 1/2021 | Gahagan | G01S 17/931 |
| 2023/0377598 A1* | 11/2023 | Goyal | G10L 25/51 |

OTHER PUBLICATIONS

Rossi et al. "AmbientSense: A real-time ambient sound recognition system for smartphones" IEEE, Jul. 8, 2013, 6 Pages. (Year: 2013).*

* cited by examiner

*Primary Examiner* — Nathnael Aynalem
(74) *Attorney, Agent, or Firm* — Honigman LLP; Matthew H. Szalach; Jonathan P. O'Brien

(57) ABSTRACT

A vehicle system includes a user device configured to produce acoustic sounds at varying frequencies. The vehicle system also includes a vehicle microphone for collecting acoustic data from the user device. Additionally, the vehicle system includes a vehicle processor for storing vehicle data including the acoustic data and a server communicatively coupled to the vehicle processor. In some examples, the server is configured to determine if the acoustic data match one or more predetermined frequencies of sound.

16 Claims, 7 Drawing Sheets

VEHICLE SYSTEM FOR DETECTING ACOUSTIC FREQUENCIES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a vehicle system for detecting acoustic frequencies.

AMBER Alerts are activated in the most serious child-abduction cases. The goal of an AMBER Alert is to instantly galvanize the community to assist in the search for and safe recovery of a missing child. These alerts are broadcast via radio, television, road signs, cellular phones, and other data-enabled devices. Some types of alerts, such as alerts from a cellular phone, have a specific acoustic sound accompanying the alert. Additionally, the alert may include information regarding the abducted child and/or a potential suspect. Further, the alert may provide information regarding a vehicle used in abducting the child including the make, model, and license plate number of the vehicle.

Vehicle telematics data for a particular vehicle may already capture one or more aspects of the foregoing data, including the make, model, and/or license plate numbers of vehicles traveling nearby. While such data is typically captured for use by the vehicle in controlling operation of the vehicle and/or assisting a driver, such telematics data could provide information for use by authorities in locating an abducted child.

SUMMARY

In one configuration, a vehicle system includes a user device configured to produce acoustic sounds at varying frequencies and a vehicle microphone for collecting acoustic data from the user device. The vehicle system also includes a vehicle processor for storing vehicle data including the acoustic data and a server communicatively coupled to the vehicle processor. In some examples, the server is configured to determine if the acoustic data match one or more predetermined frequencies of sound. The server may also be configured to digitally sample the collected acoustic data. In some examples, the server is configured to extract the collected acoustic data into pithy features including one or more of Mel Cepstrum Coefficients and Delta Energy Coefficients.

The server may also be configured to send a notification to a user if the acoustic data match one or more predetermined frequencies of sound. In some examples, the server is configured to send a notification to law enforcement if the acoustic data match one or more predetermined frequencies of sound. Additionally or alternatively, the server may be configured to connect to the user device via Bluetooth® if the acoustic data collected from the vehicle microphone match a predetermined frequency of sound. A vehicle may incorporate the vehicle system.

In another configuration, a vehicle system includes a user device configured to produce acoustic sounds at varying frequencies. The vehicle system also includes a vehicle microphone for collecting the acoustic data from the user device and a vehicle camera for collecting information related to vehicle surroundings. Additionally, the vehicle system includes a vehicle processor for storing vehicle data including the acoustic data and vehicle location. A server may be communicatively coupled to the vehicle processor.

The server may be configured to determine if the acoustic data match a predetermined frequency of sound, and extract information related to the determined frequency of sound. In some examples, the server is also configured to collect data related to vehicle surroundings using the vehicle camera and analyze vehicle data and collected data to determine if any data matches the extracted information. Additionally, the server may be configured to send a notification if the data collected matches the extracted information.

In some examples, the server is configured to digitally sample the collected acoustic data. Additionally or alternatively, the server may be configured to extract the collected acoustic data into pithy features including one or more of Mel Cepstrum Coefficients and Delta Energy Coefficients. Further, the server may use tokenization to analyze the collected data. In some examples, the server is configured to send a notification to a user if the data collected matches the extracted information. In some examples, the server is configured to send a notification to law enforcement if the data collected matches the extracted information. A vehicle may incorporate the vehicle system.

In yet another configuration, a vehicle system includes a user device configured to produce acoustic sounds at varying frequencies and a vehicle microphone for collecting acoustic data from the user device. Additionally, the vehicle system includes a vehicle processor for storing vehicle data including the acoustic data and vehicle event data. A server is communicatively coupled to the vehicle processor. In some examples, the server is configured to determine if the acoustic data collected from the vehicle microphone match a predetermined frequency of sound and alert vehicle passengers if the acoustic data match the predetermined frequency of sound. The vehicle event data may be used by the server to determine whether a vehicle event has occurred. The vehicle event may be one or more of a vehicle crash or a vehicle road exit. In some examples, the server is configured to determine whether an automatic vehicle response has been implemented. The server may be configured to cancel an alert to vehicle passengers if an automatic vehicle response has not been implemented. A vehicle may incorporate the vehicle system.

BRIEF DESCRIPTION OF THE DRAWINGS

The drawings described herein are for illustrative purposes only of selected configurations and are not intended to limit the scope of the present disclosure.

DETAILED DESCRIPTION

Figure 1:
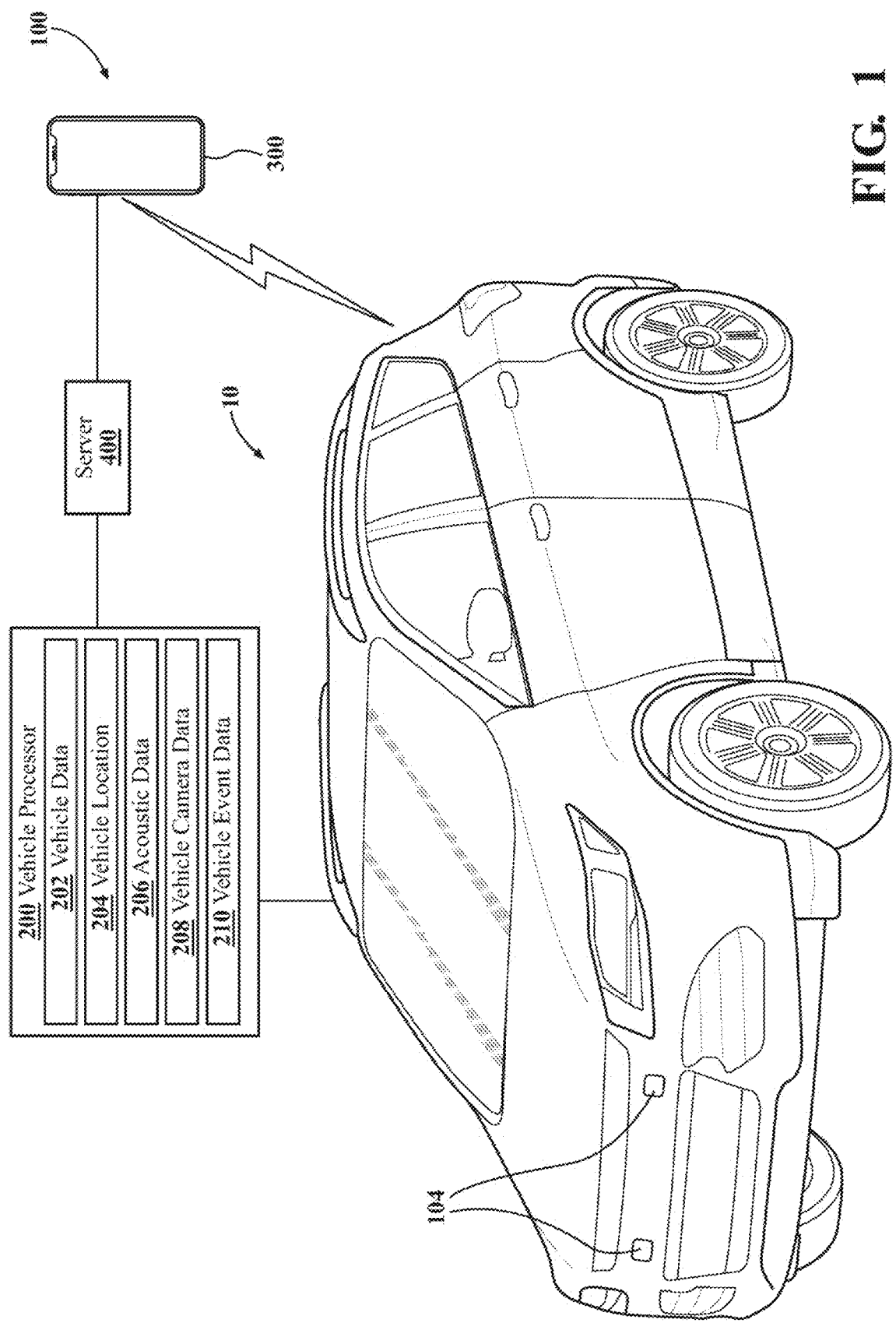
FIG. 1 is a perspective view of a vehicle exterior including a vehicle system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIGS. 1-7, a vehicle 10 having a vehicle system 100 is illustrated in FIG. 1. The vehicle 10 is contemplated to be an electric vehicle 10 (EV) and may include autonomous or semi-autonomous capabilities. Additionally or alternatively, the vehicle 10 may be a hybrid vehicle 10 incorporating both EV and internal combustion engine (ICE) components and capabilities. Additionally, the vehicle 10 may include only an internal combustion engine or other power source, if desired. In some examples, the vehicle 10 may be a land vehicle, a watercraft, or an air vehicle.

Figure 2:
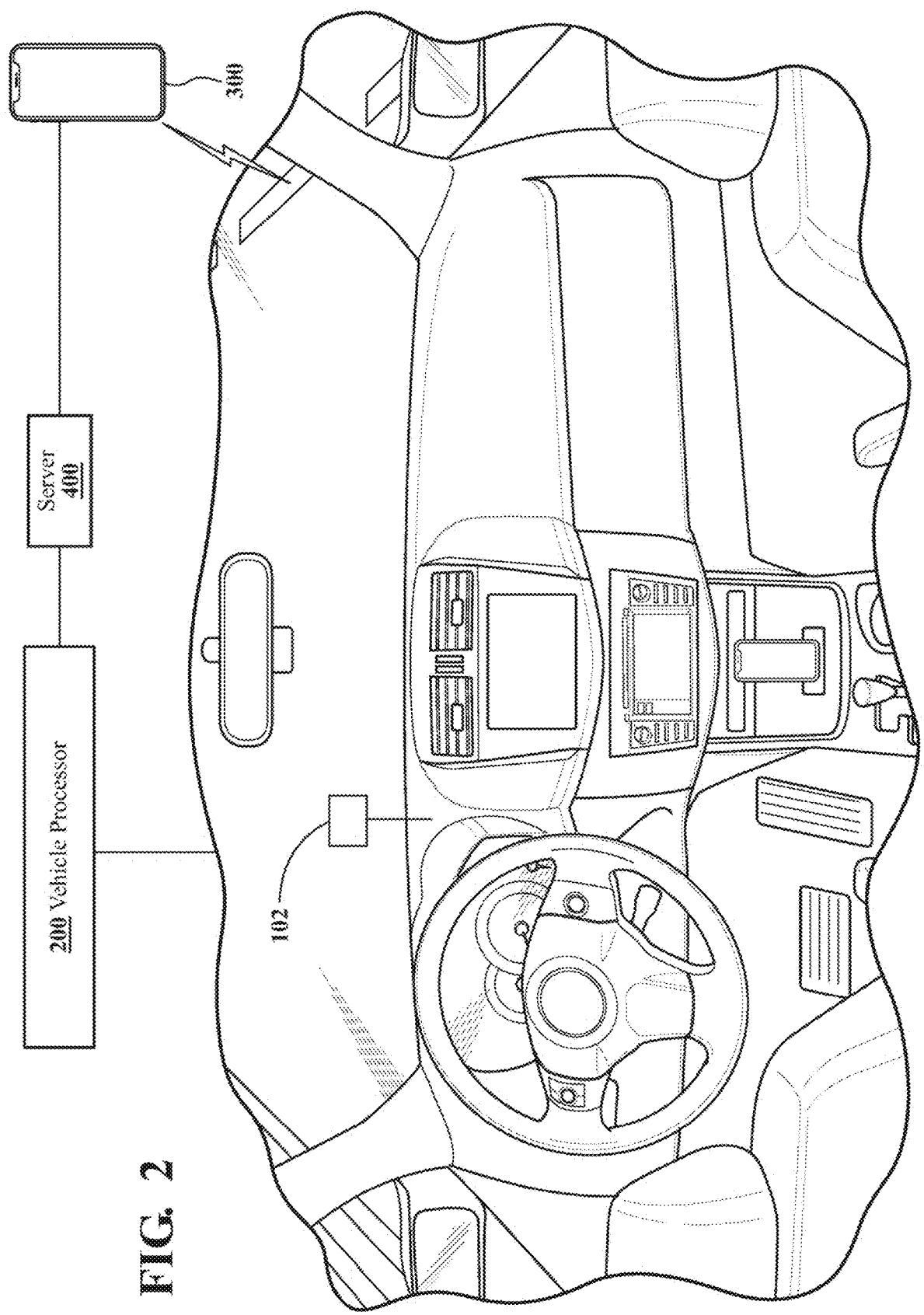
FIG. 2 is a perspective view of an interior of the vehicle of FIG. 1 including the vehicle system according to the present disclosure.

Referring to FIGS. 1 and 2, the vehicle system 100 is shown in conjunction with a user device 300 configured to produce acoustic sounds at varying frequencies. Additionally, the vehicle system 100 includes a vehicle microphone 102 for collecting acoustic data 206, a vehicle camera 104 for collecting video data, a vehicle processor 200, and a server 400 communicatively coupled with the vehicle processor 200. The user device 300 includes a display and data processing hardware that is configured to execute commands from the vehicle processor 200 and/or the server 400. In some examples, the user device 300 is a cellular phone or tablet, however, it is contemplated that the user device 300 may be any device that includes the display and data processing hardware required to execute commands from the vehicle processor 200 and/or the server 400. The user device 300 may include processing hardware and software that allow the user device 300 to communicate with a cellular network. The cellular network may be a Global System for Mobile Communications (GSM) network such as 5G, however, the cellular network may also be a Code Division Multiple Access (CDMA) network, a Time Division Multiple Access (TDMA), or other networks.

The user device 300 is configured to produce a plurality of acoustic sounds. In some examples, the acoustic sounds notify the user of a call or text. However, in some examples, the acoustic sounds notify the user of other events such as an AMBER alert or an emergency call. For example, many devices are equipped with vehicle crash detection software such that if the user device 300 detects a vehicle crash, the user device 300 may automatically place a call to emergency services. To notify the user that the emergency call is taking place, the user device 300 plays the acoustic sound. In other examples, if an AMBER alert is sent out from the National Center for Missing & Exploited Children the user device 300 plays the acoustic sound. Additionally, in other examples, a weather alert such as one or more of a Federal Emergency Management Agency (FEMA) alert, an earthquake alert, a tornado alert, and/or a tsunami alert may also be send to the user device 300. Each sound may be unique such that acoustic detection may identify each alert type.

Referring still to the example shown in FIGS. 1 and 2, the vehicle system 100 also includes the vehicle microphone 102 disposed in an interior of the vehicle 10. The vehicle microphone 102 may be any type of microphone configured to transmit and/or record the acoustic sounds disposed in and around the vehicle 10. In some examples, the vehicle microphone 102 is a dynamic microphone, a condenser microphone, and/or a ribbon microphone. However, the vehicle microphone 102 may be any type of microphone as desired. The vehicle interior may also include a vehicle dashboard disposed within the interior, which may be configured to display words or images to the driver via a display associated with the vehicle dashboard.

As best shown in FIG. 1, the vehicle system 100 includes the vehicle camera 104. The vehicle camera 104 may be any type of vehicle camera 104 including, but not limited to, an interior camera, a rear camera, a front camera, a side camera, and/or a perimeter camera. The vehicle camera 104 may be one or more of monocular cameras, binocular cameras, wide-angle cameras, or the like. In some examples, the vehicle camera 104 includes a plurality of cameras 104 that include the same type of camera or a plurality of different types of cameras. Regardless of the number, types, and locations of the vehicle cameras 104, the vehicle cameras 104 may be configured to record and/or transmit video data to the vehicle processor 200 and/or the server 400. The video data may include video data of an interior of the vehicle 10 and/or video data of an area external to the vehicle 10.

The vehicle processor 200 stores vehicle data 202 of the vehicle 10. In some examples, the vehicle data 202 includes vehicle location 204, acoustic data 206, vehicle camera data 208, and/or vehicle event data 210. The vehicle location 204 generally pertains to a location of the vehicle 10. The vehicle location 204 may be obtained from a Global Positioning System (GPS), other navigation system, a user device 300, and/or a third-party application. Regardless of how the vehicle location 204 is obtained, this information may be communicated to the vehicle processor 200. Moreover, the vehicle location data 204 may include route data such that a route the vehicle 10 is traveling may also be communicated to the vehicle processor 200.

The acoustic data 206 generally pertains to any acoustic sounds that are detected by the vehicle microphone 102. The acoustic sounds may be produced by the user device 300 or may be any other sound detected by the vehicle microphone 102.

The vehicle camera data 208 generally pertains to any recorded and/or transmitted video from any one or more of the vehicle cameras 104. In some examples, the vehicle camera data 208 may be data including images of license plates of nearby vehicles. Typically, the vehicle camera data 208 is gathered through the vehicle cameras 104 and communicated to the vehicle processor 200. However, it is contemplated that the camera data 208 may additionally and/or alternatively be gathered through crowdsourcing by obtaining camera data 208 from nearby vehicles. Data from nearby vehicles may be obtained by the vehicle processor 200 and/or the server 400 via Bluetooth®, Wi-Fi®, third-party applications, or other similar methods.

The vehicle event data 210 generally pertains to whether a vehicle event such as a vehicle crash has occurred. The vehicle event data 210 may include, but is not limited to, vehicle speed, route, or lane information that may reflect that a vehicle event has occurred. For example, the vehicle event data 210 may include data indicating that the vehicle has exited the road which, in turn, may be indicative that the vehicle 10 has been involved in a crash. Such data can be verified by one or more vehicle cameras 104, for example, if the cameras 104 detect damage to the vehicle 10 and/or contact with another vehicle. The vehicle processor 200 may capture additional data related to the vehicle exiting the road such as whether the vehicle 10 has returned to the road, has been off of the road for an extended period of time, or is in a location that could prevent the vehicle 10 from returning to the road (i.e., is near or in a body of water).

Referring again to FIGS. 1-7, the server 400 is configured as a network and/or a cloud-based system that communicates with one or both of the vehicle processor 200 and the user device 300. In some examples, the server 400 is also configured to communicate with third-party processors 500 to collect third-party data 502. For example, the third-party processors 500 may include, but are not limited to, vehicle processors 200 along the route input via the user device 300. Additionally or alternatively, the third-party processors 500 may include third-party user devices 300 within vehicles 10 along the route. It is generally contemplated that the third-party data 502 includes vehicle location data 204, vehicle event data 210, vehicle camera data 208, and/or acoustic data 206 from the third-party processors. In some examples, the vehicle location data 204 is configured to communicate to the server 400 the vehicle location 204 of each respective vehicle 10 traveling along the route. The vehicle event data 210 may be configured to communicate to the server 400 vehicle events, including, but not limited to, vehicle speed, vehicle lane merge, vehicle steering wheel angle, or other vehicle operations relating to a vehicle crash or vehicle road exit. In some examples, the vehicle camera data 208 includes transmitted or recorded images that may pertain to information received in various alerts, which may be communicated to the server 400. Additionally, in some examples, the acoustic data 206 from the vehicle microphone 102 is configured to be transmitted to the server 400 to determine whether the acoustic data 206 matches any predetermined acoustic sounds.

It is also contemplated that the vehicle processor 200 may communicate any or all of the vehicle data 202 to the server 400 for further processing and/or evaluation. The vehicle processor 200 and/or the server 400 may continuously and/or regularly update such that the vehicle data 202 is updated in real time.

Figure 3:
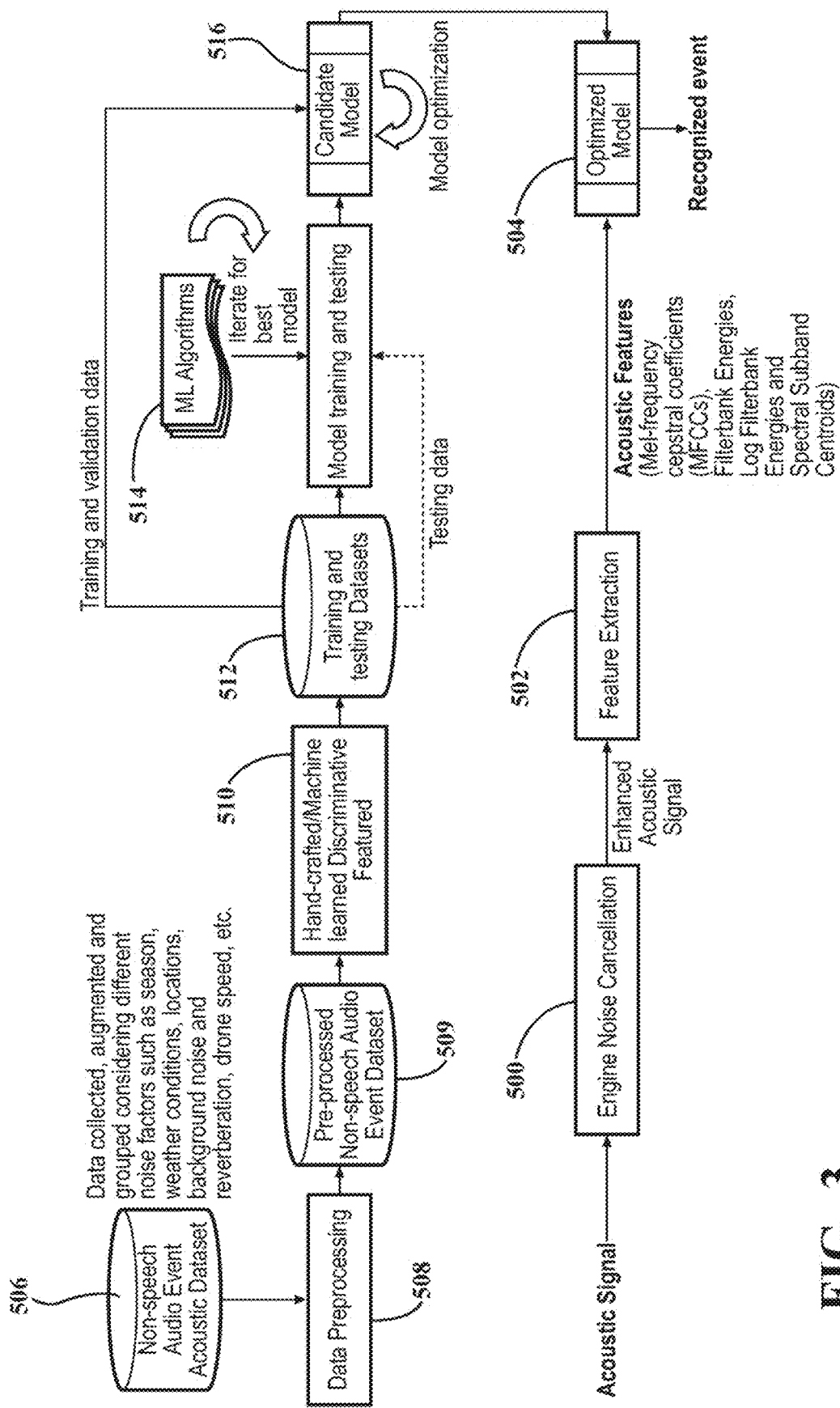
FIG. 3 is an exemplary functional block diagram according to one aspect of the present disclosure.

Referring now to the example shown in FIG. 3, the server 400 is configured to determine if the acoustic data 206 match one or more predetermined frequencies of sound. In some examples, the server 400 may be configured to digitally sample the collected acoustic data 206. Additionally, the acoustic data 206 captured by the vehicle microphone 102 may then be stripped to remove engine noise and other background noise in step 500. In some examples, the enhanced acoustic signal then undergoes feature extraction at step 502. For example, the server 400 may be configured to extract the collected acoustic data 206 into pithy features including one or more of Mel Cepstrum Coefficients, Delta Energy Coefficients, Filterbank Energies, Log Filterbank Energies, and Spectral Subband Centroids. Statistical algorithms including one or more of Random Forests, Deep Neural Network, and Bayesian Classifier may be used to assist in determining whether the acoustic data matches the one or more predetermined frequencies of sound. The features are then inputted into an optimized model at step 504 where the server 400 determines if the acoustic features match the predetermined sound of the optimized model.

The optimized model may be continuously or otherwise updated and improved. For example, at step 506 the data set is formed and augmented and/or grouped using various noise considerations including, but not limited to, season, weather conditions, locations, background noise, reverberation, drone speed, or the like. The data set is then sent to data preprocessing at step 508, where it is outputted as pre-processed data set at step 509. Additionally, in some examples, the pre-processed data set is entered into machine learning devices at step 510 for training and testing the datasets. In some examples, the testing data is entered into the model training at step 512 where Machine Learning (ML) algorithms iterate for the best model at step 514 before it is entered to a candidate model at step 516. Additionally, the training data may be entered directly as a candidate model at step 514. Once the model is optimized, the optimized model returns to step 504 where it can be used to recognize an acoustic event such as an AMBER alert or an emergency call.

Additionally, in some examples, the server 400 is configured to consider data from the alert when using navigation features. For example, if it is determined that the acoustic data matches a predetermined frequency of sound such as a tsunami alert, the server 400 may suggest a route that avoids the area where the alert is located or may suggest re-routing options if the vehicle 10 is currently routed to be near the location of the alert.

Additionally, in some examples, the server 400 is also configured to send a notification to a user if the acoustic data 206 match one or predetermined frequencies of sound. For example, if the server 400 determines an AMBER alert has been detected, the server 400 may be configured to notify the driver of the alert through audio and/or through the vehicle dashboard.

Referring again to the example shown in FIGS. 1-7, if the server 400 determines the acoustic data 206 matches the predetermined frequency of sound, the server 400 may determine that an AMBER alert has been activated. Once the server 400 has determined that an AMBER alert has been activated, the server 400 may extract information related to the AMBER alert. The extracted information may include information related to the suspect including, but not limited to, vehicle information such as the make, model, color, and/or the license plate of the vehicle in question. The license plate information may include the state, license plate number, and color of the license plate. Additionally, in some examples, tokenization may be used on the extracted information to protect sensitive data.

Figure 4:
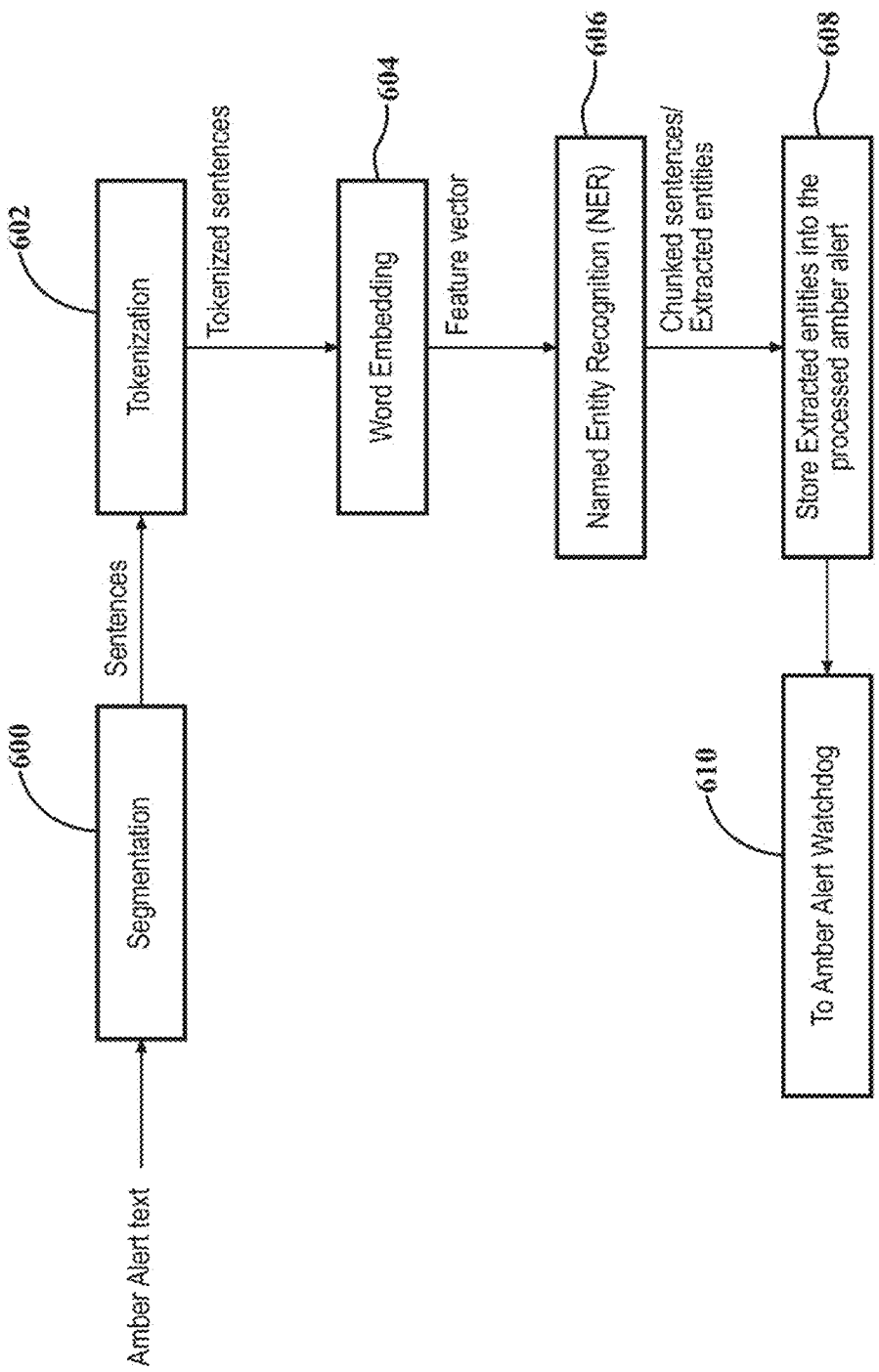
FIG. 4 is an exemplary functional block diagram according to another aspect of the present disclosure.

Referring now to the example shown in FIG. 4, once the AMBER alert is received, the server 400 may use segmentation to break up text contained in the alert into actionable sentences at step 600. The sentences then may go through tokenization at step 602 to protect privacy. Additionally, once the tokenization has occurred, the data may undergo word embedding to determine a feature vector at step 604. Moreover, the data undergoes Named Entity Recognition (NER) to assist in extracting entities at step 606. Additionally, the extracted entities may be processed into the alert at step 608 and this data may be sent elsewhere in the server 400 for additional processing at step 610, as described in more detail below.

Once the data from the alert has been extracted, the server 400 is configured to collect data related to vehicle surroundings using the vehicle camera 104. The data collected may include, but is not limited to, the extracted information from the AMBER alert such as the vehicle make, model, color, and/or the license plate information described above. Additionally, in some examples, the server 400 may be configured to analyze the vehicle data 202 and/or the collected data from the vehicle camera data 208 to determine if any data matches the extracted information from the AMBER alert. In some examples, to analyze the data, the server 400 uses a weighted algorithm across each of these attributes extracted from the alert. For example, the vehicle color may be weighted highly while the vehicle model may be weighted lower providing a customized analyzation for each alert.

If the server 400 determines that any collected data matches the extracted information, the server 400 may be configured to send a notification to the driver and/or to law enforcement with the information. The notification may include one or more of an audio announcement, a visual display on the dashboard, a notification to the user device 300, or a phone call or text message.

Additionally, in some examples, if the server 400 determines an emergency call tone has been detected, the server 400 may be configured to notify the driver of the alert through an audio and/or visual indication. Additionally or alternatively, if the server 400 determines that the acoustic data 206 collected from the vehicle microphone 102 match a predetermined frequency of sound, the server 400 may be configured to connect to the user device 300 through Bluetooth® or other wireless methods. In some examples, when the server 400 is connected to the user device 300, the server 400 may send a notification to law enforcement or the server 400 may be configured to end a duplicate emergency call (i.e., end a call made by the vehicle 10 if a call has already been made by the user device 300 or end the call made by the user device 300).

Additionally, in some examples, if the server 400 determines the acoustic data 206 matches the predetermined frequency of sound and the vehicle data indicates a vehicle event such as a vehicle road exit or a vehicle crash, the server 400 may determine that an emergency call has been placed. Moreover, if the acoustic data 206 matches the predetermined frequency of sound, the vehicle event data 210 is used by the server 400 to determine whether a vehicle event has occurred. If a vehicle event such as a vehicle crash has occurred, the server 400 is configured to determine whether an automatic vehicle response has been implemented. In some examples, the automatic vehicle response may be an automatic call to emergency services by a vehicle telematics system such as Guardian® or OnStar® or other vehicle communication systems. Additionally, in some examples, if the automatic vehicle response has been implemented, the server 400 may be configured to connect to the user device 300 through Bluetooth® and cancel the emergency call. Alternatively, in some examples, if the automatic vehicle 10 response has not been implemented, the server 400 may be configured to cancel the alert such that the emergency call from the user device 300 continues.

Figure 5:
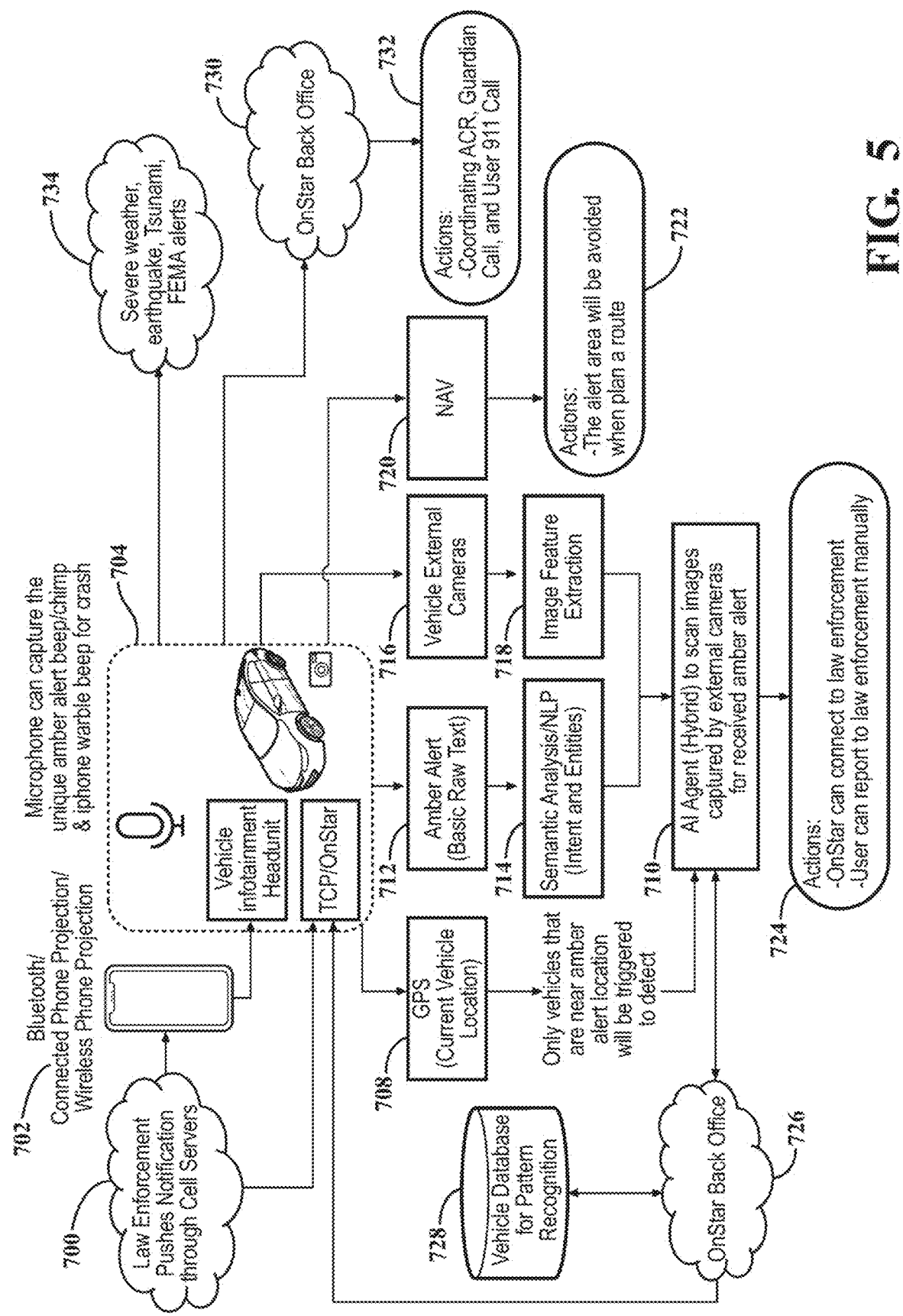
FIG. 5 is an exemplary flowchart according to another aspect of the present disclosure.
Figure 6:
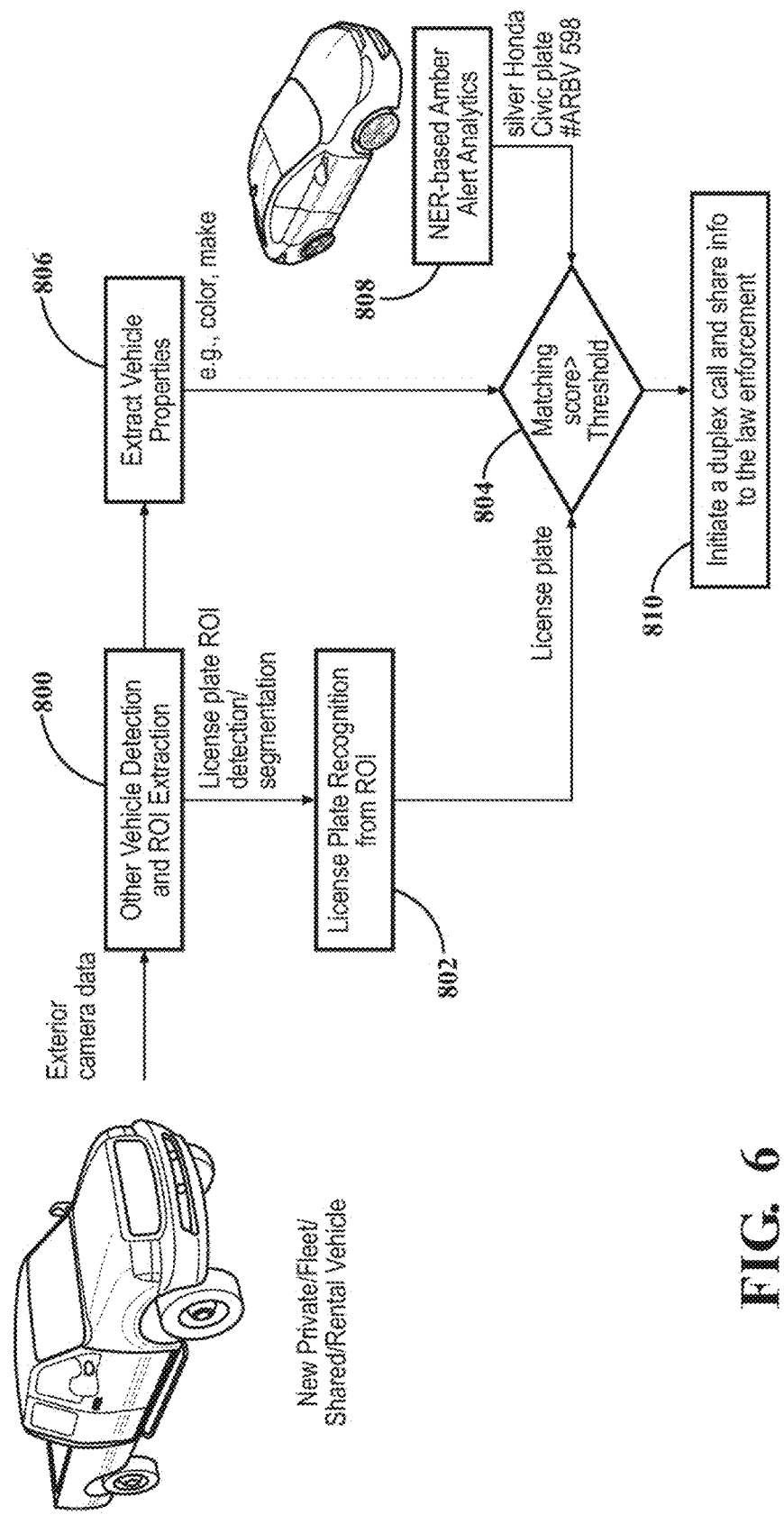
FIG. 6 is an exemplary flowchart according to another aspect of the present disclosure.
Figure 7:
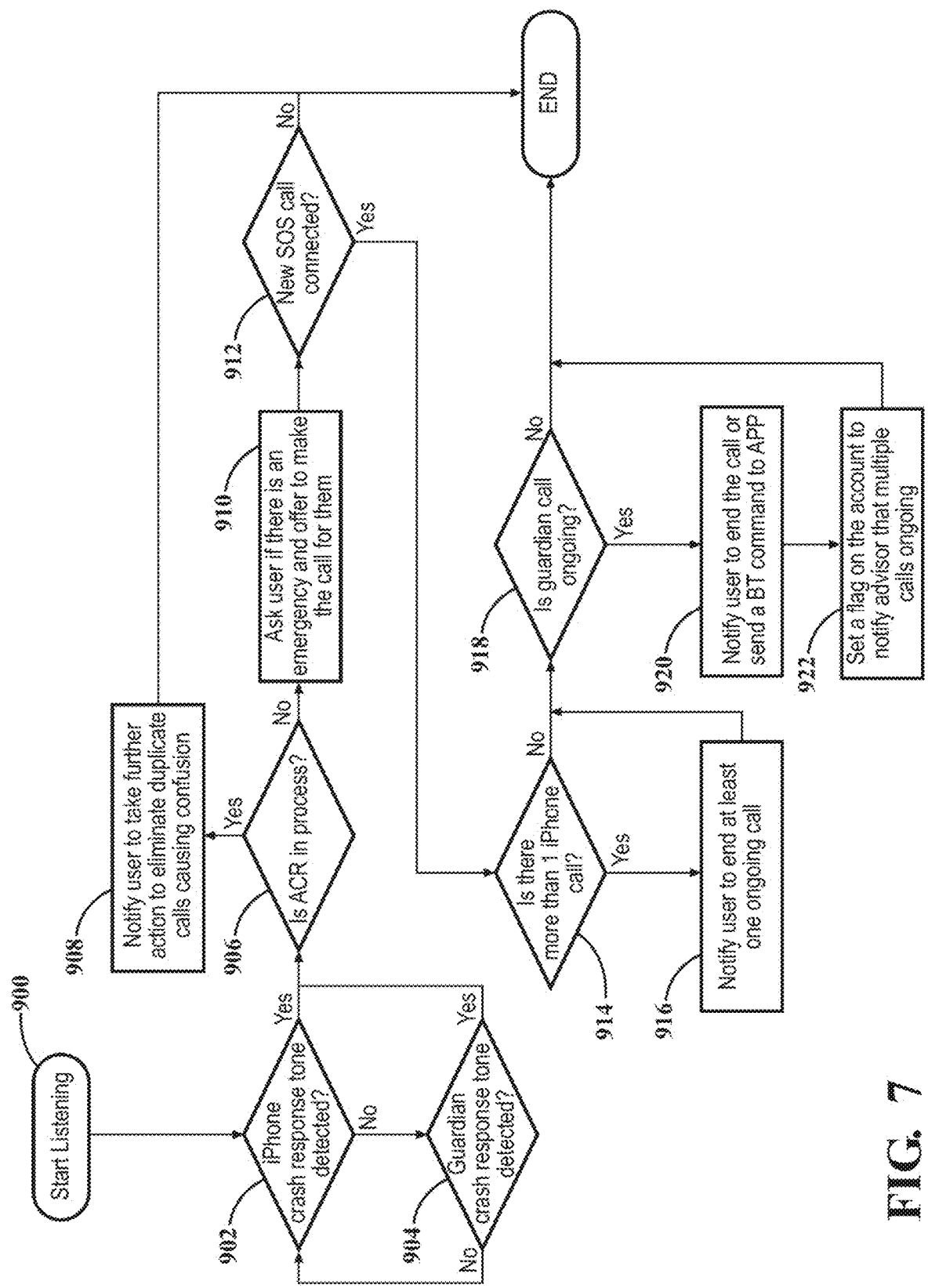
FIG. 7 is an exemplary flowchart according to another aspect of the present disclosure.

Referring now to FIGS. 1-7, example flow diagrams of operations of the vehicle system 100 are set forth in FIGS. 5-7. Referring first to the example flow diagram of operations of the vehicle system 100 illustrated in FIG. 5, a push notification such as an AMBER alert from law enforcement is pushed through cellular servers in step 700. The user device 300 receives the notification at step 702 and plays the acoustic sound related to the alert. The vehicle microphone 102 is configured to transmit the acoustic data 206 to the server 400 for comparison to predetermine acoustic data 206 at step 704. If a matching acoustic sound is found, such as an AMBER alert, the server 400 is configured to determine the vehicle location 204 at step 708 such that only vehicles 10 near the alert will be activated. Next, at step 710, the vehicle location 204 is inputted into an artificial intelligence (AI) agent to scan images captured from the vehicle camera 104 from nearby vehicles to determine if any images match the data from the alert. Simultaneously to step 708, the server 400 is configured to extract the raw text data from the AMBER alert in step 712. Next, semantic analysis and entity extraction are performed on the raw text data in step 714 and the extracted entities are also transmitted to the AI agent to scan images captured from the vehicle cameras 104 of nearby vehicles to determine if any images match the data from the alert at step 710. Additionally, simultaneously to steps 708 and 712, the vehicle cameras 104 are activated to transmit and/or record data and transmit that data to the server 400 at step 716 where image features are then extracted at step 718. Once the image features are extracted, the extracted features are transmitted to the AI agent to scan images captured from the vehicle cameras 104 from nearby vehicles to determine if any images match the data from the alert at step 710. Additionally, in some examples, the navigation system is also activated at step 720. The server 400 may determine it is safer to avoid areas related to an alert, depending on the type of alert determined, when planning the vehicle route at step 722.

Once the AI agent has determined there are matching images captured from the vehicle cameras 104 as in the AMBER alert at step 710, the server 400 may notify the user of the matching data and either ask the user to call law enforcement or may use the vehicle telematics system such as Guardian® or OnStar® to connect to law enforcement directly at step 724. Additionally, in some examples, the matching images are also transmitted to a back office of the vehicle telematics system at step 726 and uploaded to a vehicle database to improve pattern recognition at step 728.

Additionally, if the server 400 determines a matching acoustic sound is found, the server 400 may be configured to connect to the vehicle telematics system back office at step 730 in anticipation on an emergency call by the vehicle telematics system and/or the user at step 732. Additionally, if the matching acoustic sound is determined to be a severe weather alert such as at step 734, the server 400 may be configured to notify the user of the severe weather alert and further determine whether the vehicle route may be interrupted or otherwise delayed.

Referring now to the example flow diagram of operations of the vehicle system 100 in FIG. 6, when the vehicle 10 is in operation, the vehicle camera(s) 104 is operating and transmitting data to the server 400. The server 400 may be configured to detect other vehicles 10 and/or extract region of interest (ROI) images at step 800. Next, the region of interest may be processed and/or segmented to determine license plate recognition from the ROI at step 802. The license plate information is then transmitted to determine whether the license plate information matches the information extracted from the alert and whether the data reached a threshold to determine whether a matching vehicle has been found at step 804. In step 806, the extracted vehicle properties from the vehicle camera 104 such as color, make or model, are processed to determine whether the detected color, make, or model matches the values extracted from the alert. The color, make, and model information is then transmitted to determine whether the data reaches the threshold to determine if a matching vehicle has been located. Additionally, the server 400 may be configured to use Named Entity Recognition-based analytics to determine vehicle information at step 808. Finally, if it is determined that the data exceeds a predetermined matching threshold at step 804, in some examples, the server 400 may be configured to initiate a call to share the information with law enforcement at step 810.

Referring now to FIG. 7, an example flow diagram of operations of the vehicle system 100 is set forth. More specifically, in step 900, the vehicle microphone 102 is configured to start listening (i.e. transmitting and/or recording) audio data. In some examples, the vehicle microphone 102 may be activated when a user turns the vehicle 10 on or otherwise opts-in to the vehicle system 100. Once the vehicle microphone 102 is listening and audio data is transmitted, the server 400 is configured to determine whether a crash response from the user device 300 is detected at step 902 or if a vehicle telematics system response tone is detected at step 904. If a crash response is detected, the server 400 determines whether the automatic crash response (ACR) has been activated by the vehicle 10, at step 906. If the automatic crash response, such as an emergency call through the vehicle telematics system such as Guardian® or OnStar® or other telematics devices, has been activated, the server 400 may notify the user to take further action such as to stop the emergency call from the user device 300 at step 908 to eliminate duplicate emergency calls. If the automatic crash response is not detected, the server 400 may be configured to ask the user if there is an emergency and offer to make an emergency call for the user through the user device 300 at step 910. Then, if a new call is connected at step 912, the server 400 is configured to determine whether more than one user device 300 is on an outgoing call at step 914. If there is more than one outgoing call, the server 400 is configured to notify the user to end one of the calls to eliminate duplicate emergency calls at step 916. Similarly, if the new call is connected at step 912, the server 400 is configured to determine whether a call from the vehicle telematics system is ongoing at step 918. If a call is ongoing from the vehicle telematics system, the server 400 is configured to notify the user to end the call or the server 400 is configured to connect to the user device 300 by Bluetooth® or another method to end the duplicate emergency call at step 920. Additionally, if the call from the vehicle telematics system is ongoing, the server 400 is configured to set a flag to the vehicle telematics system such as Guardian® or OnStar® account for notification to an advisor that multiple emergency calls are ongoing so the advisor can notify the user and/or the proper emergency services.

The vehicle system 100 as described herein includes the vehicle microphone 102, the vehicle camera(s) 104, the vehicle processor 200, and the server 400. The vehicle processor 200 transmits acoustic data 206 from the vehicle microphone 102 to the server 400 where the server 400 is configured to determine whether the transmitted acoustic data 206 matches any predefined acoustic data 206. In the examples where the predefined acoustic data 206 is an AMBER alert, the vehicle system 100 may then assist law enforcement by capturing the vehicle surroundings, and determine if the vehicle surroundings are pertinent to the current AMBER alert. If they are, this information can be sent to law enforcement to assist with returning abducted children to their families. Additionally, in the example where the predefined acoustic data 206 is an automatic emergency call from the user device 300, the vehicle system 100 can determine if this automatic emergency call would be a duplicate emergency call and then prompt the user to end the call and/or connect through Bluetooth® and force-end the emergency call to prevent confusion to emergency services. As such, the vehicle system 100 as described herein provides valuable safety enhancements for the user of the vehicle 10 and the community as a whole.

A number of implementations have been described. Nevertheless, it will be understood that various modifications may be made without departing from the spirit and scope of the disclosure. Accordingly, other implementations are within the scope of the following Claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A system comprising:
a vehicle comprising:
a vehicle microphone configured to collect acoustic data produced by a user device;
one or more sensors configured to collect sensed data representing an environment of the vehicle;
a vehicle processor for storing vehicle data including the acoustic data and the sensed data; and
a server communicatively coupled to the vehicle and configured to:
receive the vehicle data including the acoustic data and the sensed data from the vehicle;
determine if the acoustic data matches a predetermined emergency alert;
based on the acoustic data matching the predetermined emergency alert, extract, from the acoustic data, information related to the emergency alert;
determine, by processing the sensed data, whether the extracted information matches an element in the environment; and
based on the extracted information matching the element in the environment, send a notification to an emergency response agent regarding the emergency alert.

2. The system of claim 1, wherein the server is configured to digitally sample the collected acoustic data.

3. The system of claim 2, wherein the server is configured to extract the collected acoustic data into pithy features including one or more of Mel Cepstrum Coefficients and Delta Energy Coefficients.

4. The system of claim 1, wherein the server is configured to send the notification to a user of the vehicle.

5. The system of claim 1, wherein the emergency response agent is law enforcement.

6. The system of claim 1, wherein the server, based on the extracted information matching the element in the environment, is configured to connect to the user device through a wireless connection.

7. A system comprising:
a vehicle comprising:
a vehicle microphone configured to collect acoustic data produced by a user device;
one or more sensors configured to collect sensed data representing an environment of the vehicle;
a vehicle camera for collecting information related to vehicle surroundings;
a vehicle processor for storing vehicle data including the acoustic data, the sensed data, and vehicle location; and
a server communicatively coupled to the vehicle and configured to:
receive the vehicle data including the acoustic data, the sensed data, and the vehicle location from the vehicle;
determine if the acoustic data matches a predetermined emergency alert;
based on the acoustic data matching the predetermined emergency alert, extract, from the acoustic data, information related to the emergency alert;
collect data related to vehicle surroundings using the vehicle camera;
determine, by processing the sensed data and collected data, whether the extracted information matches an element in the environment; and
based on the extracted information matching the element in the environment send a notification to an emergency response agent regarding the emergency alert.

8. The system of claim 7, wherein the server is configured to digitally sample the collected acoustic data.

9. The vehicle system of claim 8, wherein the server is configured to extract the collected acoustic data into pithy features including one or more of Mel Cepstrum Coefficients and Delta Energy Coefficients.

10. The system of claim 7, wherein the server uses tokenization to analyze the collected data.

11. The system of claim 7, wherein the server is configured to send the notification to a user of the vehicle.

12. The system of claim 7, wherein the emergency response agent is law enforcement.

13. A vehicle system comprising:
a vehicle comprising:
a vehicle microphone configured to collect acoustic data produced by a user device;
one or more sensors configured to collect sensed data representing an environment of the vehicle;
a vehicle processor for storing vehicle data including the acoustic data, the sensed data, and vehicle event data; and
a server communicatively coupled to the vehicle and configured to:
receive the vehicle data including the acoustic data, the sensed data, and the vehicle event data from the vehicle;
determine if the acoustic data collected from the vehicle microphone matches a predetermined emergency alert;
based on the acoustic data matching the predetermined emergency alert, extract, from the acoustic data, information related to the emergency alert;
determine, by processing the sensed data and the vehicle event data, whether the extracted information matches an element in the environment; and
based on the extracted information matching the element in the environment, send a notification to an emergency response agent regarding the emergency alert.

14. The system of claim 13, wherein the vehicle event data indicates a vehicle event that comprises one or more of a vehicle crash or a vehicle road exit.

15. The system of claim 13, wherein the server is configured to determine whether an automatic vehicle response has been implemented.

16. The system of claim 13, wherein the server is configured to cancel an alert to vehicle passengers if an automatic vehicle response has not been implemented.

* * * * *